United States Patent [19]

Hetz

[11] 4,095,611

[45] Jun. 20, 1978

[54] MODULATING FLOW CONTROL VALVE ASSEMBLY

[75] Inventor: Heinz K. Hetz, Halicong, Pa.

[73] Assignee: Yarway Corporation, Blue Bell, Pa.

[21] Appl. No.: 759,764

[22] Filed: Jan. 17, 1977

[51] Int. Cl.² .................................... G05D 11/00
[52] U.S. Cl. .......................................... 137/115
[58] Field of Search .................. 137/115, 116, 116.3, 137/117

[56] References Cited

U.S. PATENT DOCUMENTS

| | | | |
|---|---|---|---|
| 2,445,544 | 7/1948 | Trautman | 137/117 |
| 3,007,481 | 11/1961 | Frost | 137/116 |
| 3,068,882 | 12/1962 | Odendahl | 137/116 |
| 3,318,321 | 5/1967 | Odendahl | 137/117 |
| 3,604,446 | 9/1971 | Brooks | 137/115 |
| 3,640,359 | 2/1972 | Clark et al. | 137/115 X |
| 3,723,025 | 3/1973 | Coakley | 137/116 X |
| 4,019,527 | 4/1977 | Brand | 137/115 |

FOREIGN PATENT DOCUMENTS

1,453,786  8/1971  Germany.

*Primary Examiner*—William R. Cline
*Attorney, Agent, or Firm*—John W. Logan, Jr.

[57] ABSTRACT

The preferred embodiment of the invention disclosed herein includes a main check valve movable between a fully closed and fully open position in response to the flow requirements from a pressure source to a demand system and including an intermediate position wherein the flow to the demand system corresponds to a predetermined minimum flow from the pressure source. Also included is a bypass valve for controlling the flow from the pressure source to a recirculation system. In the fully closed position of the main check valve, the bypass valve is in a fully open position whereby a predetermined minimum flow from the pressure source is maintained; in the intermediate position of the main check valve, the bypass valve is closed and remains closed between the intermediate position of the main check valve and its fully open position. Operation of the bypass valve is responsive to movement of the main check valve and is controlled by fluid from the inlet side of the main check valve which acts on opposite faces of a piston associated with the bypass valve. The pressure on one face of the piston is controlled by a pilot valve of the throttling type which valve is responsive to the position of the main check valve such that pressure on the one face of the piston is vented when the main check valve is closing and is increased when the main check valve is opening.

14 Claims, 3 Drawing Figures

MODULATING FLOW CONTROL VALVE ASSEMBLY

The invention disclosed herein relates to a flow control valve assembly and, more particularly, to a modulating flow control valve assembly of the type disclosed in application, Ser. No. 554,401 filed Mar. 3, 1975 by Warren H. Brand now U.S. Pat. No. 4,019,527, and assigned to the assignee of this invention and of the type including a bypass valve for dividing input flow to the valve assembly between two output systems whereby a predetermined minimum input flow is maintained.

Various fluid systems include a pressure fluid supply which is to be divided between two output systems in accordance with flow changes in one of the latter systems so that a minimum supply is maintained. For example, steam generating plants generally include a centrifugal feed water pump providing an output flow to a feed water heater. In these plants, it is usual to provide for the continuous operation of the pump and to utilize a check valve the position of which is responsive to the demand flow requirements of the heater. Flow through the pump also functions to cool it so that during periods of relatively low demand from the heater when the output of the pump falls below a minimum flow rate, it is possible for the pump to overheat. Accordingly, when the demand from the heater falls below the noted minimum, it is usual to maintain the output of the pump at the noted minimum rate and to recirculate the excess flow back to the pump. By recirculating a portion of the output, the pump is protected from overheating.

Recirculation of the output from the pump can be provided by manual operation of a bypass valve which, of course, is relatively expensive and unreliable or could be provided by a bypass valve controlled by a flow meter detecting flow on the inlet side of the pump. When the flow on the inlet side of the pump drops below the minimum required to cool the pump, the flow meter causes the bypass valve to be opened maintaining the pump output at the required minimum and diverting that portion of the flow not required by the feed water heater to a sump connected to the inlet of the pump. Such an arrangement involves relatively complex and expensive apparatus and has not been found to be satisfactory. An alternative to either of the techniques described above and one which has been found to be generally satisfactory for most systems involves the use of a modulating flow control valve assembly including a main check valve the position of which is responsive to the demand flow requirements of the heater and an on-off bypass valve for recirculating flow back through the pump during the periods of low demand by the heater. While valve assemblies of the type described are known in the art, they are not entirely satisfactory in certain systems, particularly, in large steam generating plants where the minimum flow requirement through the pump is relatively large. One problem with valve assemblies of the type described when utilized in these applications is caused by the on-off operation of the bypass valve which causes abrupt changes in the output of the pump. These abrupt changes provide a water hammer effect, that is, sudden surges in the output of the pump which may be detrimental to the pump, the piping system and the remainder of the associated fluid system.

Accordingly, it is an object of this invention to provide a modulating flow control valve assembly including a check valve and a bypass flow control valve wherein flow through the bypass valve varies inversely with flow through the check valve.

It is another object of this invention to provide a modulating flow control valve assembly including a check valve and a bypass flow control valve arranged such that the flow through the check valve is along a generally straight line to minimize the pressure drop across the valve.

It is yet another object of this invention to provide a modulating flow control valve assembly including a check valve and a bypass flow control valve that operates rapidly in response to the check valve to divide flow through the assembly.

Finally, it is an object of this invention to provide a modulating flow control valve assembly that is simple, rugged and economical and which is particularly useful in steam generating plants for maintaining a minimum output from a feed water pump.

These and other objects of this invention are accomplished by providing a modulating flow control valve assembly including main check valve means movable between a fully closed position and a fully open position in response to the flow requirements of a demand system from a pump or other pressure source. The check valve also includes an intermediate position wherein the flow thereacrosss corresponds to a predetermined or preselected minimum output flow from the pump. Also included in the assembly is bypass valve means having a fully open position when the check valve means is in its closed position and a fully closed position when the check valve means is in its intermediate position for diverting flow not required by the demand system between the closed and intermediate position of the main check valve to a recirculation system. Operation of the bypass valve means is controlled by fluid from the inlet side of the check valve acting on opposite faces of a piston associated with the bypass valve means and by pilot valve means operative in response to the movement of the main check valve means to vent fluid on one face of the piston as the check valve means is closing and to increase fluid pressure on the one face of the piston as the check valve means is opening.

More particularly, the valve assembly includes an inlet opening and an axially aligned outlet opening and the main check valve means is axially aligned with the openings to minimize the pressure drop across the check valve. The bypass valve means is arranged for movement at a right angle to the movement of the check valve means.

Even more particularly the pilot valve means is movable toward a closed position under the influence of fluid pressure as the check valve means is opening and is movable to an open position as the check valve means is closing by linkage means operatively associated between the check valve means and the pilot valve means. The linkage means is also operative to prevent the pilot valve means from moving toward the closed position unless the check valve means is opening.

For a better understanding of the invention, reference is made to the following description of a preferred embodiment thereof taken in conjunction with the figures of the accompanying drawing in which.

Referring now to the drawings, there is disclosed a modulating flow control valve assembly 10 particularly adapted to be used in a steam generating system for controlling the output flow of a feed water pump to a feed water heater. It should be understood, however, that a valve assembly in accordance with this invention is usable between other pressure sources and demand systems of the type wherein the pump is continuously operative and wherein the demand system has a variable flow requirement or, in fact, in various other systems where it is desirable to provide a bypass flow. However, to simplify the description of the preferred embodiment of the invention, reference will be made to a pump and a heater. The valve assembly 10 includes a main check valve 12 responsive to the demand requirements of the heater for modulating the flow of fluid from the pump to the heater and also includes a bypass valve 14 for modulating the flow of fluid from the pump to a recirculation system such that a predetermined or preselected minimum output flow from the pump is maintained even if the main check valve is fully closed. Both the main check valve 12 and the bypass valve 14 are contained in a valve body 16 formed with an inlet opening 18 and an outlet opening 20, the former communicating with the discharge port on the pump and the latter communicating with the heater. Between the inlet opening 18 and the outlet opening 20, the valve body 16 is formed with a bore 22 and counterbore 24 which are concentrically arranged with respect to the inlet and outlet openings. Accordingly, there is provided a first axial flow path through the valve body which extends in a generally straight line so that the pressure drop of fluid flow therethrough is minimized. Extending at a right angle to the bore 22 is another bore 26 providing a second flow path in the valve body extending at a generally right angle to the first flow path and which communicates with a recirculation port 28 arranged to be connected to a sump supplying the pump or otherwise connected to a bypass system.

The main check valve 12 includes a valve seat 30 located at the juncture of the bore 22 and counterbore 24, and also includes a valve disc member 32 formed with an enlarged diameter flange portion 34 having a diameter greater than the diameter of the valve seat so that a valve surface 36 cooperates with the valve seat to allow or prevent the flow of fluid. Extending from the valve surface 36 toward the inlet opening 18 and inwardly toward the longitudinal axis of the disc member 32 is a first tapered surface 38 and a second tapered surface 40. In operation, the main check valve 12 is controlled by the pressure differential across the valve seat 30, that is, by the demand flow requirements of the heater. When the demand flow requirement of the heater increases, the pressure differential across the valve seat 30 is such that the valve disc member 12 moves toward the discharge opening 20 so that the valve surface 36 and the tapered surfaces 38 and 40 move away from the valve seat allowing flow. Because of the tapered surfaces 38 and 40, the size of the opening across the valve seat 30 increases as the valve disc member 32 moves toward the discharge opening 20 whereby increased flow is permitted as the main valve disc member opens. Conversely, decreased flow is permitted as the main valve disc member 32 moves toward the valve seat 30 under the influence of the pressure differential. Thus, the flow across the main check valve 12 is modulated. It should also be noted that the flow across the valve seat 30 is at an angle to the cylindrical wall of counterbore 24. To minimize wear on that wall, a replaceable insert ring 41 can be located in the counterbore. When the disc 32 rises to the the position illustrated in FIG. 2 of the drawing, the valve is opened to an intermediate position in which the flow across the main check valve 12 is equal to the predetermined or preselected minimum output flow to be maintained from the pump. By changing the angle of the tapered surface 38, the preselected minimum flow may be varied. Still referring to FIG. 2 of the drawing, it can be seen that the main valve disc 32 is movable to a fully opened position allowing flow past the main check valve which exceeds the predetermined or preselected minimum output flow of the pump. Thus, it can be seen that the main check valve 12 has a closed position, an intermediate position and a fully open position and it should be understood that it could be moved to a variety of positions between the three noted positions.

A guide arrangement for guiding movement of the valve disc member 32 between its fully closed and open position is provided. It can be seen that extending from the valve disc member 32 toward the inlet opening 18 there is a stem 42 having a cylindrical portion 44 slidably received in a bearing member 46 supported in the bore 22 by a plurality of webs 48. It can also be seen that the stem 42 is formed with an enlarged diameter portion 50 having an elongated axial slot 52 formed therein which rides on rollers 54,54 mounted for rotation in a manner to be explained hereinafter. On the side of the main valve disc 32 adjacent the output opening 20, it can be seen that the main valve disc member is generally hollow and has a concentric sleeve 55 carried therein which receives a stem 56 supported in the counterbore 24 by a plurality of webs 58. A compression spring 60 bears between an internal face 62 formed in the main valve disc member and between a bearing assembly 64 fixed to the stem 56. It should be understood that the compression spring 60 biases the disc member 32 toward the inlet opening 18 so that the valve surface 36 normally bears on the valve seat 30.

Located in the bore 26 is a head member 66 having a cup-shaped portion 68 and a stem portion 70 extending axially from the closed end of the cup-shaped portion into the slot 52 on the stem 42. As seen in the drawing the rollers 54,54 are mounted on the stem portion 70. The interior of the cup-shaped portion 68 is formed with a bore and a counterbore to provide a flow chamber 72 and a control chamber 74. A plurality of radial ports 76 are formed through the cylindrical wall of the cup-shaped portion so that fluid can flow from the bore 22 forming part of the main flow path downwardly between the bore 26 and the head member 66, through the radial ports 76 to the flow chamber 72. As clearly seen in the drawing, a sleeve 78 is clamped in a seat between the open end of the cup-shaped portion 68 and a seat formed in an extension of the bore 26 adjacent the recirculation port 28. Adjacent the open end of the cup-shaped portion 68 the sleeve 78 is formed with a valve seat 80 forming part of the bypass valve 14. Helical slots 82 are formed in the interior wall portion of the bushing 78 and as will be made clear hereinafter serve to throttle the flow of fluid as it is discharged past the valve seat 80 whereby the pressure of the fluid is reduced significantly. From the lowermost slot 82 illustrated in the drawing, the fluid is discharged at a reduced pressure to the recirculation port 28 which carries a replaceable insert ring 84 to prevent undue wear on the valve body portion 16.

Figure 1:
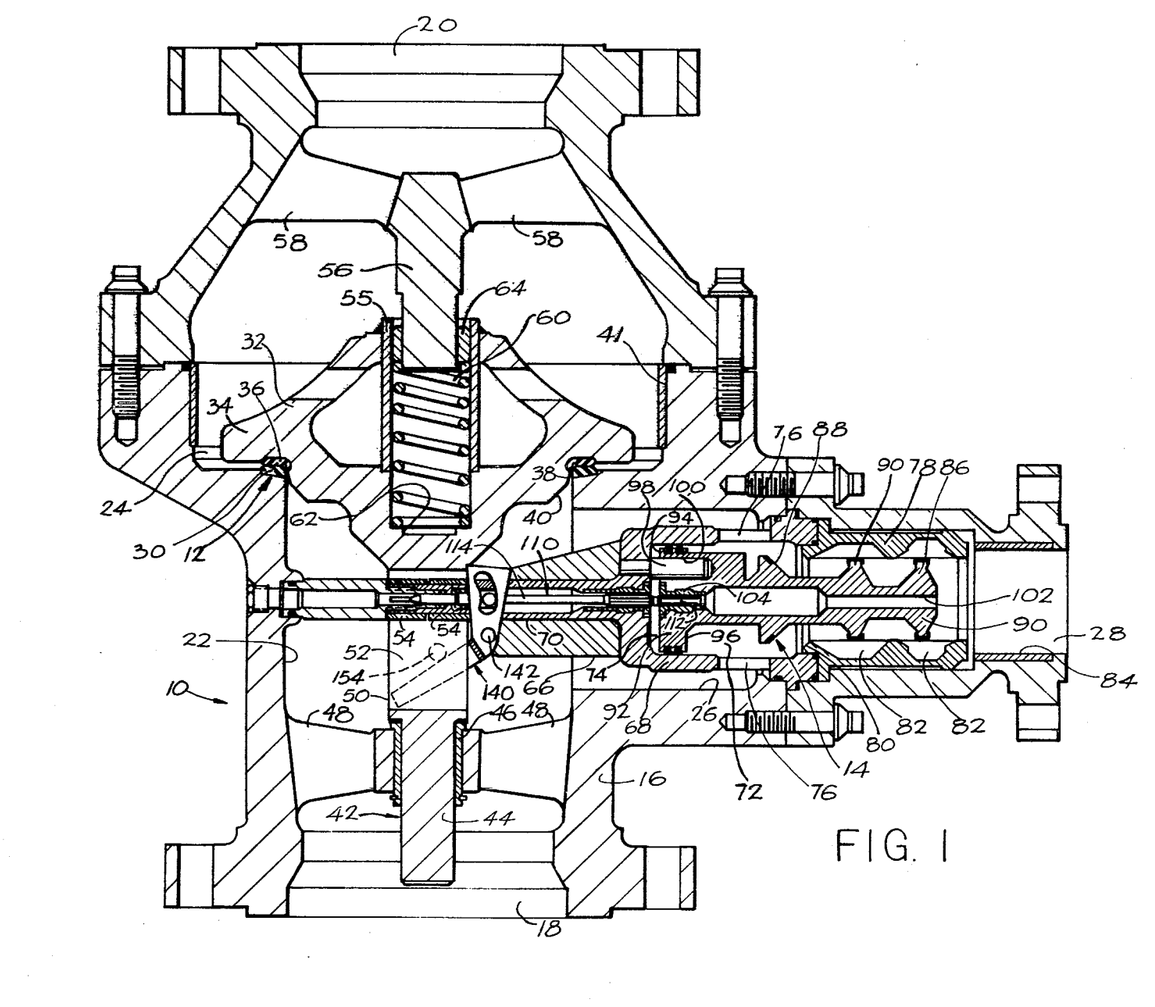
FIG. 1 is a longitudinal section view of a valve assembly in accordance with this invention illustrating the closed position of the check valve means and the fully open position of the bypass valve means.

Continuing the description of the bypass valve 14, a bypass valve member 86 is slidably received in the sleeve 78 and is formed with a conical valve surface 88 that cooperates with the valve seat 80 for modulating flow thereacross, that is, flow progressively increases as the valve opens and progressively decreases as the valve closes. In FIG. 1 of the drawing the fully open position of the bypass valve 14 is shown and in FIG. 2 of the drawing the fully closed position of the bypass valve is shown. Spaced axially along the bypass valve member 86 are a pair of land portions 90 that cooperate with the slots 82 for throttling the fluid flow through the slots to the recirculation port 28. When the bypass valve 14 is closed the land portions 90 bear on the lower ends of the slots 82 to prevent flow and as the bypass valve opens the land portions move away from the lower ends of the slots to allow increased flow.

The desired predetermined or preselected minimum flow requirement of the pump to be protected in designed into the valve structure of the present invention and can be easily changed from valve-to-valve during manufacture by relatively minor modifications to the valves. The changes are accomplished by varying the angle and/or length of the tapered surface 38 on the check valve disc member 32 and by similarly varying the angle and/or length of the conical valve surface 88.

Figure 2:
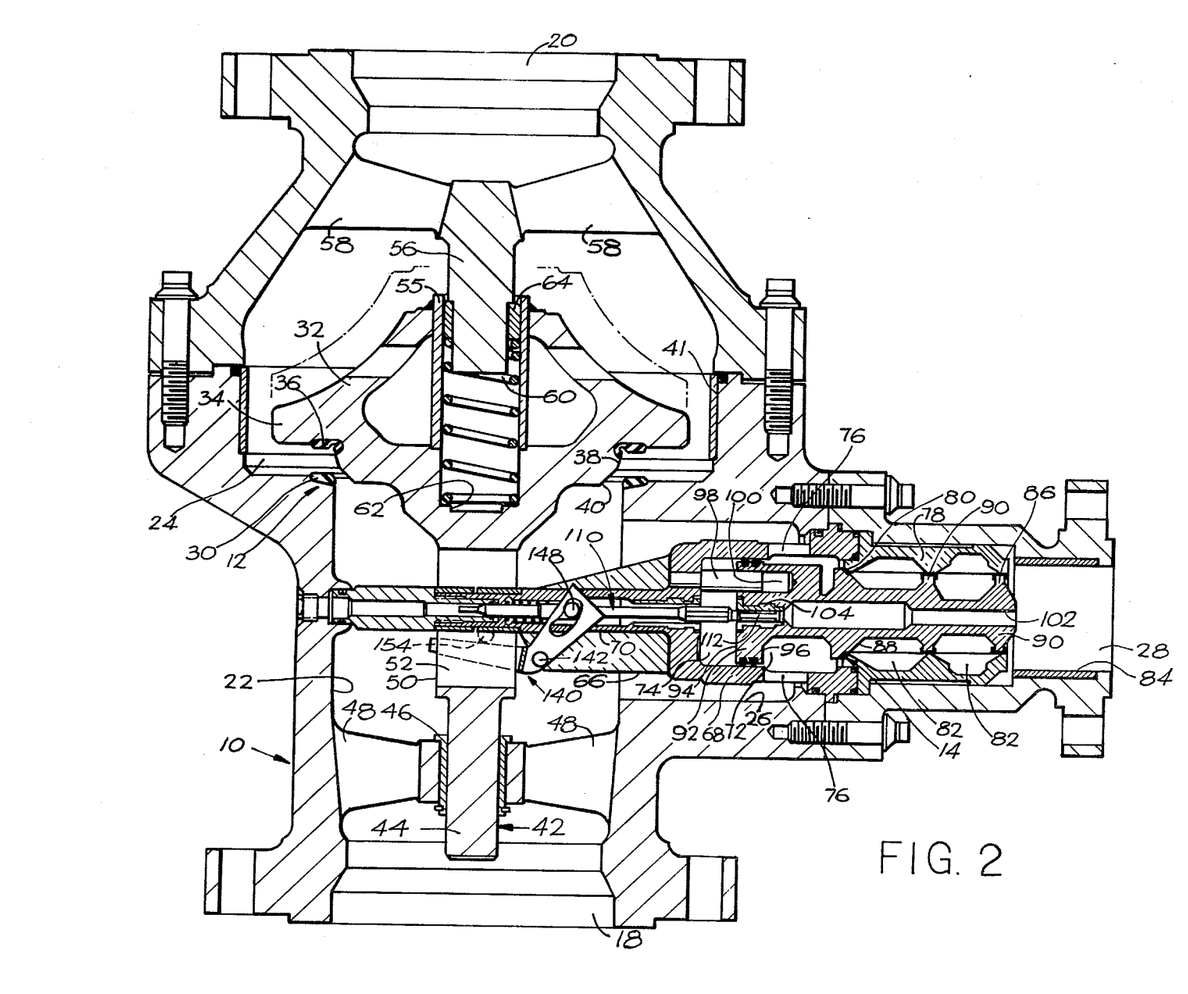
FIG. 2 is a section view similar to FIG. 1, but illustrating the open position of the check valve means and the closed position of the bypass valve means; and, FIG. 3 is an enlarged section view of the bypass valve means and pilot valve means illustrated in FIGS. 1 and 2 of the drawing.

Movement of the bypass valve 14 between its open and closed positions is responsive to the position of the main check valve 12 such that the bypass valve is in its fully open position when the main check is in its closed position and in its fully closed position when the main check valve is in its intermediate position or positions between its intermediate and fully open position as illustrated by the dotted lines in FIG. 2 of the drawing. Accordingly, the conical valve surface 88 is spaced from the bypass valve seat 80 a distance equal to the distance between the valve surface 36 and the check valve seat 30 when the main check valve is in its intermediate position and these noted distances are, in turn, equal to the axial length of the tapered surface 38 modulating flow across the check valve 12. Further, the lands 90 are spaced from the top of the slots 82 by a distance also equal to the distance between the valve surface 36 and valve seat 30 of the main check valve when that valve is in its intermediate position. Thus, the flow through the bypass valve varies inversely with the flow through the main check valve so that a minimum flow through the valve assembly is maintained and so that there are no abrupt changes in flow. That is, the flow through the bypass valve progressively increases with flow through the main check valve and progressively decreases with increases through the main check valve.

In order to control the position of the bypass valve 14 the bypass valve member 86 is formed with a piston 92 which is slidably received in the control chamber 74. Thus, the upper face 94 of the piston 92 forms a movable boundary in the control chamber and the lower face 96 of the piston is exposed to fluid pressure in the flow chamber 72 which pressure is substantially equal to the pressure on the inlet side of the main check valve 14. Extending axially through the bypass valve member 86 is a passage 102 so that the control chamber 74 communicates with the discharge side of the bypass valve 12. As will be made clear hereinafter the control chamber 74 also communicates with the inlet side of the main check valve 12. The upper face 94 of the piston has a larger area than the lower face 96. In addition, the end wall of the cup-shaped portion 68 of the head 66 is formed with a guide pin 98 extending into the control chamber 74 and the pin is received in a bore 100 formed through the piston 92 so that the guide pin and the bore cooperate to prevent rotation of the piston and of the bypass valve member 86.

Figure 3:
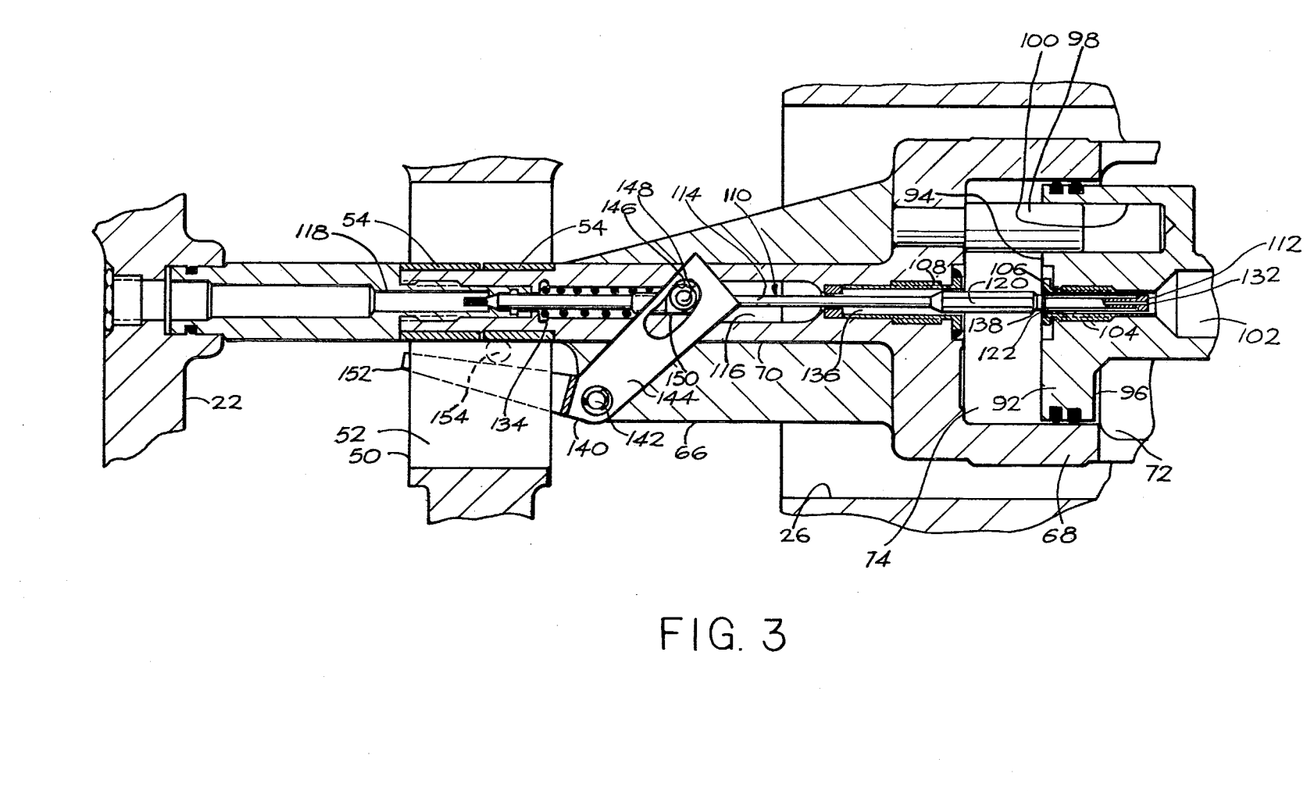

With reference to FIG. 3 of the drawing it can be seen that upper face 94 of the piston 92 receives a flanged portion of a bushing 104 which extends into a reduced diameter portion of the passage 102. The surface of the bushing 104 adjacent the control chamber 74 is formed with a valve seat 106 forming part of a pilot valve controlling pressure in the control chamber 74. Aligned with the bushing 104 is another bushing 108 located in the end wall of the cup-shaped portion 68 and the stem portion 70 of the head member 66. Extending through the bushings 104 and 108 is a rod member 110 having a first diameter portion 112 located in the bushing 104 and a second slightly smaller diameter portion 114 extending through the bushing 108. The smaller diameter portion 114 of the rod member 110 also extends from the bushing 108 through an open slot 116 in the stem portion 70 of the head 66 into a control chamber 118 formed in the stem portion 70 above the slot 116. Thus, the area of the end of the rod member 110 in the control chamber 118 is slightly smaller than the area of the end thereof located in the bushing 104. Between the bushings, the rod member 110 is formed with an enlarged diameter portion 120 having a polygonal cross-section, preferably, hexagonal. A pilot valve surface 122 is formed adjacent the lower end of the portion 120 and cooperates with the pilot valve seat 106 to throttle fluid flow from the control pressure chamber 74 through the passage 102 to the discharge side of the bypass valve 14.

As noted previously the control chamber 74 communicates with the inlet side of the main check valve 12. Communication is provided by making the inner diameter of the bushing 108 larger than the enlarged diameter portion 120 of the rod member 110 so that a flow passage is provided between the slot 116 in the stem portion 70 and the control chamber 74. The inner diameter of the bushing 108 is fluted to receive the polygonal cross-section of the enlarged diameter portion 120 of the rod member 110 to prevent rotation of the rod member while still providing a flow passage. Similarly, the inner diameter of the bushing 104 is larger than the diameter of section 112 of the rod member 110 including the enlarged end section thereof so that communication between the control chamber 74 and the discharge side of the bypass valve 14 is not prevented. Additionally, a flow passage 132 is formed through the center of the rod member 110 so that communication between the control chamber 118 and the discharge side of the bypass valve 114 is provided. A spring member 134 located in a chamber in the stem portion 70 biases the rod member 110 and thus the pilot valve surface 122 toward the pilot valve seat 106 with a light spring force.

At this point, it will be explained that the net fluid pressure forces acting on the rod member 110 act to bias the rod member downwardly so that the pilot valve surface 122 is biased toward the pilot valve seat 106. Relatively low pressure from the discharge side of the bypass valve acts on each end surface of the rod member 110. Since this pressure is substantially equal at each side of the rod member 110 and since the area of the end surface in the control chamber 118 is smaller than the other end surface, there is a small net force biasing the rod member 110 upwardly. This net force, however, is opposed by forces developed by the higher pressure exerted by fluid from the inlet side of the main check valve 12 which pressure acts on the tapered surface 136 extending between the sections 114 and 120 of the rod member and on the smaller tapered surface 138 in the control chamber 74 extending from the section 120 to a cylindrical surface located above the pilot valve surface 122. Since these pressures are substantially equal and since the area of surface 136 is larger than that of surface 138 there is a net force biasing the rod member 110 downwardly. The net force exerted by inlet pressure is larger than the net force developed by the bypass valve discharge pressure, the resultant fluid forces on the rod member 110 bias the pilot valve surface 122 toward pilot valve seat 106. The resultant fluid pressure force is, of course, combined with the light force exerted by the spring member 134.

Pivoted to a web extending from the stem portion 70 of the head member 66 is a generally L-shaped yoke member 140 including a pair of interconnected parallel legs 144 and a single leg 152 extending at an angle from one of the parallel legs. The yoke member 140 is pivoted adjacent the intersection of the legs 144 and 152 to a pin 142. Each leg 144 is formed with a slot 146 in which a roller 148 is received and the roller is carried on a sleeve 150 fixed to the rod member 110; the other leg 152 extends adjacent the outer surface of the enlarged diameter portion 50 of the stem 42 and bears on a pin 154 carried on the outer surface of the portion 50. It should be understood that as the main check valve 12 closes, that is, when the main valve disc 32 moves toward the main valve seat 30, the stem 42 moves toward the inlet opening 18 and the pin 154 pivots the yoke member 140 in a counter-clockwise direction as viewed in the drawing. As the leg 144 pivots, of course, the rod member 110 is moved upwardly against the fluid pressure forces and the light spring force and the pilot valve surface 122 is moved away from the pilot seat 106. Also, as the main check valve 12 opens, that is, when the main valve disc moves away from the main valve seat 30, the stem 42 moves toward the main valve seat and the pin 154 moves away from the leg 152 of the yoke member 140. When the pin 154 no longer bears on the leg 152, the fluid pressure acting on the rod member 110 and the light force exerted by the spring 134 moves the rod member downwardly so that the pilot valve surface 122 moves toward the pilot valve seat 106. Movement of the yoke member 140 in either direction and thus of the pilot valve surface 122 continues until the main valve disc 32 comes to rest and the engagement of the leg 152 and pin 154 is again operative to retain the yoke member 140 in an at rest position.

Having described a preferred embodiment of a modulating flow control valve assembly in accordance with this invention, its operation will now be explained.

Assume that the pump is not operating so that there is no flow to the inlet port 18. Under the assumed condition the main check valve 12 and the bypass valve 14 are closed and the rod member 110 is held in the uppermost position illustrated in FIG. 1 of the drawing so that the pilot valve surface 122 is adjacent the end wall of the cup-shaped portion 68 of the head member 66, that is, the pilot valve is in an open position. When the pump becomes operative, fluid flows through the inlet port 18 into the bore 22 and exerts sufficient force to open the main check valve 12, that is, to move valve disc member 32 toward the outlet opening 20 so that the main check valve moves to its fully open position. Accordingly, fluid flows across the main check valve 12 through the counterbore 24 and the outlet opening 20 to the heater. Simultaneous with the preceding movement of the valve disc member 32, the pin 154 moves from the leg 152 of the yoke member 140 whereby the spring 134 urges the rod member 110 toward the open end of the cup-shaped portion 68 of the head member 66 and fluid flows through the passage between rod member 110 and the bushing 108 to the control chamber 74. As noted previously the fluid forces acting on the tapered surfaces 136 and 138 of the rod member also bias the rod member 110 toward the open end of the cup-shaped portion 68. Accordingly, the pilot valve surface moves downwardly toward the pilot valve seat 106 throttling fluid flow through the passage between the rod member 110 and the bushing 104 whereby pressure in the control chamber 74 builds up. Simultaneous with the preceding fluid flows from the bore 22 into the bore 26, through the radial ports 76 and into the flow chamber 72. Because the area of face 94 of the piston 92 is larger than that of the face 96, the fluid force retains the bypass valve 14 closed.

If now the demand of the heater decreases such that the valve disc member 32 moves to a position between the closed and intermediate positions of the main check valve 12, the pin 154 engages the leg 152 of the yoke member 140 and pivots the yoke member in a counterclockwise direction about the pin 142 whereby the legs 144 of the yoke member pivot in the same direction moving the rod member upwardly through the engagement of the slots 146 and rollers 148. Upward movement of the rod member 110 moves the pilot valve surface 122 away from the pilot valve seat 106 so that the fluid is vented from the control chamber 74 and the pressure acting on the face 94 of the piston 92 decreases. When the pressure decreases sufficiently, the inlet pressure acting on the face 96 of the piston 92 opens the bypass valve member 86, that is, moves bypass valve surface 88 from the bypass valve seat 80. When the main valve disc 36 comes to rest, movement of the rod member 110 ceases and the pilot valve surface 122 will come to rest in the control chamber 74. The bypass valve member 86 continues moving upwardly under the influence of the pressure in the flow chamber 72 acting on the face 96 of the piston 92 and when the piston valve seat 106 closely approaches the pilot valve surface 122, the flow of fluid through the passage between the rod member 110 and the bushing 104 is throttled causing the pressure in the control pressure chamber 74 to increase. Thus, the force on the face 94 of the piston 92 will equal the force exerted on the face 96 of the piston so that the valve member comes to rest at a position proportioning the predetermined flow from the pump flows through the main check valve 12 and the bypass valve 14 as indicated previously. At this point fluid from the discharge side of the bypass valve 14 acts on the end face of the rod member 110 in the bushing 104 and on the end face in the control chamber 118.

When the heater requires additional flow from the pump, a pressure differential across the main check valve 12 causes the valve disc member 32 to move away from the valve seat 30. As valve disc member 32 moves the pin 154 moves away from the leg 152 of the yoke member 140 and the net fluid forces acting on the rod member 110 and the force exerted by the spring 134 urge the rod member 110 toward the open end of the cup-shaped portion 68 of the head member 66. Such movement continues until the leg 152 of the yoke member 140 is again held in position by the pin 154 when the main valve disc 32 comes to rest or until the leg engages the stem portion 70 of the head depending on the rest position of the main valve disc. As the rod member 110 moves downwardly, the pilot valve surface 122 approaches the pilot valve seat 106 throttling the flow of fluid from the control chamber 74 through the passage between the rod member and the bushing 104. As this flow is throttled, the pressure in the control pressure chamber 74 builds up and acting on the larger face 94 of the piston 92 overcomes the inlet pressure force acting on the face 96 of the piston so that the valve member 86 moves downwardly, as viewed in the drawing. That is, the inclined bypass valve surface 88 moves toward the bypass valve seat 80 reducing the flow of fluid to the slot 82,82 and to the recirculation port 28. Assuming the main check valve 12 has not exceeded its intermediate position, a balanced steady state position will be assumed whereby the required portion of the flow from the pump is discharged across the main check valve and the excess portion flows across the bypass valve 14 to the recirculation port 28. If the main valve disc 32 moves beyond its intermediate position, it should be understood that the bypass valve 14 closes completely so that there is no bypass flow.

If the operation of the pump is discontinued, the pressure differential across the main check valve 12 drops so that the valve disc member 32 moves toward the main valve seat 30 and eventually closes. Of course the pin 154 pivots the leg 152 of the yoke member 140 in a counterclockwise direction about the pivot pin 142 whereby the legs 144 of the yoke member pivot in the same direction moving the rod member 110 upwardly through the engagement of the slots 146 and 148. Accordingly, the pilot valve surface 122 moves away from the pilot valve seat 106 causing the fluid in the control chamber 74 to vent to the discharge side of the bypass valve 14. As the pressure in the control chamber 74 drops, the piston 92 along with the bypass valve member 86 move to an open position so that when the main check valve 12 is closed the bypass valve 14 is open.

In the foregoing description of a preferred embodiment of the invention, it should be clear that the flow of the fluid from the inlet opening across the main check valve to the outlet opening is axial and experiences no right-angle turns so that the pressure drop through the main valve assembly between the pump and the heater is minimized. In addition, it can be seen that as the main check valve closes, the pilot valve is opened so that the pilot valve surface moves away from the pilot valve seat. In the event that the operation of the pump is discontinued, the pilot valve surface does not slam against the pilot valve seat which could cause severe forces through the seat and the pilot valve surface damaging either or both members of the pilot valve. In addition, it should be appreciated that the operation of the bypass valve follows closely in time the operation of the main check valve because the position of the pilot valve changes quickly in response to the movement of the main check valve, that is, the pilot valve is held in its open position against fluid pressure by the main check valve and this pressure is operative as soon as the main check valve moves and the pilot valve is moved to its open position as the main check valve moves.

While in the foregoing there has been described a preferred embodiment of the invention, it should be obvious to one skilled in the art that various changes and modifications can be made within the true spirit and scope of the invention as recited in the appended claims.

1. A modulating flow control valve assembly including main check valve means movable between a fully closed and a fully open position in response to the flow requirement of a demand system and including an intermediate position wherein the flow to the demand system corresponds to a preselected minimum flow from a pressure source, and bypass valve means movable between a fully closed and a fully open position, and control means responsive to the position of said main check valve means for controlling the position of said bypass valve means such that said bypass valve means is in its fully open position when said main check valve means is in its fully closed position and such that said bypass valve means is in its fully closed position when said main check valve means is in its intermediate position, said control means including a control chamber communicating with the inlet side of said main check valve means and piston means associated with said bypass valve means, said piston means being slideable in said control chamber with one surface thereof being exposed to fluid therein and with the opposite surface thereof being exposed to fluid on the inlet side of said bypass valve means, said control means further including pilot valve means for controlling fluid pressure in said control chamber, operating means operatively associated with said pilot valve means and said main check valve means for moving said pilot valve means to a position wherein fluid is vented from said control chamber thereby reducing fluid pressure acting on said one surface of said piston means as said main check valve means is closing and for allowing said pilot valve means to move to a position wherein fluid flow from said control chamber is throttled thereby increasing fluid pressure acting on said one surface of said piston means as said main check valve means is opening.

2. A modulating flow control valve assembly in accordance with claim 1 wherein said one surface of said piston means has a larger area than the other said surface thereof.

3. A modulating flow control valve assembly in accordance with claim 1 wherein said pilot valve means includes surfaces exposed to fluid pressure acting to move said pilot valve means toward a closed position as said main check valve means is opening, said generating including linkage means operatively arranged between said main check valve means and said pilot valve means for moving said pilot valve means.

4. A modulating flow control valve assembly in accordance with claim 3 wherein said linkage means comprises a generally L-shaped link assembly arranged for pivotal movement at the intersection of its legs, one leg of said link assembly being operatively associated with said pilot valve means and the other leg of said link assembly being adjacent to a bearing member on said main check valve means.

5. A modulating flow control valve assembly in accordance with claim 3 wherein spring means is associated with said pilot valve means for biasing said pilot valve means toward a closed position.

6. A modulating flow control valve assembly in accordance with claim 3 wherein said pilot valve means includes a pilot valve surface formed on a rod member, said rod member being formed with said surfaces exposed to fluid pressure, the area of said surfaces exposed to fluid pressure acting to close said pilot valve means being larger than the area of said surfaces exposed to fluid pressure acting to open said pilot valve means.

7. A modulating flow control valve assembly in accordance with claim 1 wherein said main check valve means and said bypass valve means are movable at right angles to each other.

8. A modulating flow control valve assembly in accordance with claim 1 including an inlet opening, an outlet opening axially aligned with said inlet opening, said main check valve means being axially aligned with said inlet and outlet openings whereby flow from said inlet opening to said outlet opening travels in a single direction.

9. A modulating flow control valve assembly comprising a valve body including an inlet opening, an outlet opening and a recirculation opening, main check valve means located between said inlet and outlet openings and bypass valve means located on the inlet side of said main check valve means between said inlet opening and said recirculation opening, said main check valve means comprising a main valve seat and a movable valve disc member having a closed position preventing fluid flow from said inlet opening to an outlet opening, an intermediate position allowing a predetermined flow from said inlet opening to said outlet opening and a fully open position allowing full flow from said inlet port to said outlet port, said bypass valve means comprising a bypass valve seat and a movable bypass valve member having a closed position preventing fluid flow from said inlet opening to said recirculation opening and a fully open position allowing said predetermined flow from said inlet opening to said recirculation opening, and control means responsive to the position of said valve disc member for controlling the position of said bypass valve member such that said bypass valve member is in its fully open position when said valve disc member is in its closed position and such that said bypass valve member is in its closed position when said valve disc member is in any position between its intermediate position and its fully open position, said control means including a control chamber communicating with the inlet side of said main check valve means and the discharge side of said bypass valve means, piston means on said bypass valve member slidably received in said control chamber so that one surface of said piston is exposed to fluid in said control chamber and an opposite surface thereof is exposed to fluid on the inlet side of said bypass valve means, said one surface having a larger area than said opposite surface, and pilot valve means for controlling flow from said control chamber to said discharge side of said bypass valve member, said pilot valve means including a pilot valve seat on said piston means and a movable pilot valve member having a position venting flow from said control chamber to reduce the pressure therein whereby said bypass valve member is movable toward its fully open position and a position throttling flow from said control chamber to increase the pressure therein whereby said bypass valve member is movable toward its closed position, said pilot valve member including surfaces exposed to fluid pressure such that the net fluid force acting on said pilot valve member biases said pilot valve member toward said pilot valve seat, and linkage means operatively connected between said valve disc member and said pilot valve member for moving said pilot valve member toward its venting position as said valve disc member moves toward its closed position and for allowing said pilot valve member to move toward its throttling position as said valve disc member moves toward its open position.

10. A modulating flow control valve assembly in accordance with claim 9 wherein said linkage means comprises a generally L-shaped link assembly arranged for pivotal movement at the intersection of its legs, one leg of said link assembly being associated to said pilot valve member through a roller and slot connection, and the other leg of said link assembly seating on a bearing member on said valve disc member.

11. A modulating flow control valve assembly in accordance with claim 9 wherein said valve disc member and said bypass valve member move at right angles to each other.

12. A modulating flow control valve assembly in accordance with claim 9 wherein said inlet opening, said outlet opening and said main valve seat are axially aligned whereby flow from said inlet opening to said outlet opening travels in a single direction.

13. A modulating flow control valve assembly in accordance with claim 12 wherein said valve disc member and said bypass valve member move at right angles to each other.

14. A modulating flow control valve assembly in accordance with claim 12 wherein certain surfaces on said pilot valve member are exposed to fluid pressure acting to move said pilot valve member toward said pilot valve seat and wherein certain other surfaces on said pilot valve are exposed to fluid pressure acting to move said pilot valve member away from said pilot valve seat, the area of said certain surfaces being larger than the area of said certain other surfaces.

* * * * *

UNITED STATES PATENT OFFICE
CERTIFICATE OF CORRECTION

Patent No. 4,095,611      Dated June 20, 1978

Inventor(s) Heinz K. Hetz

It is certified that error appears in the above-identified patent and that said Letters Patent are hereby corrected as shown below:

Claim 3, line 5, change "generating" to --operating means--;

line 7, after "means" second occurrence, insert a period (.)

line 8, delete in its entirety.

Signed and Sealed this

Sixteenth Day of January 1979

[SEAL]

Attest:

RUTH C. MASON
*Attesting Officer*

DONALD W. BANNER
*Commissioner of Patents and Trademarks*